(12) United States Patent
Hafeez et al.

(10) Patent No.: US 8,121,145 B2
(45) Date of Patent: Feb. 21, 2012

(54) CONTENTION-BASED RANDOM ACCESS METHOD WITH AUTONOMOUS CARRIER SELECTION

(75) Inventors: Abdulrauf Hafeez, Cary, NC (US); Kambiz Zangi, Chapel Hill, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 792 days.

(21) Appl. No.: 12/255,378

(22) Filed: Oct. 21, 2008

(65) Prior Publication Data

US 2010/0098043 A1    Apr. 22, 2010

(51) Int. Cl.
*H04L 12/43* (2006.01)
(52) U.S. Cl. ..... 370/461; 370/229; 370/230; 370/230.1; 370/458; 370/462
(58) Field of Classification Search .................. 370/229, 370/230, 230.1, 329, 336, 337, 395.4–395.43, 370/458, 461, 462
See application file for complete search history.

(56) References Cited

U.S. PATENT DOCUMENTS 6,567,420 B1 * 5/2003 Tiedemann et al. .......... 370/468

FOREIGN PATENT DOCUMENTS

WO    WO 2008/051466 A2    5/2008

* cited by examiner

*Primary Examiner* — Hassan Kizou
*Assistant Examiner* — Ashil Farahmand

(57) ABSTRACT

The method and apparatus described herein controls transmission from a plurality of user terminals to an access point on a random access channel in a wireless communication system. An access point determines an allowed information rate for each user terminal and transmits a rate control parameter indicative of the allowed information rates to the user terminals. The access point also computes a packet transmission probability and transmits the packet transmission probability to the use terminals on a common control channel. The packet transmission probability controls the number of user terminals that transmit in a given time slot to reduce collisions and increase the departure rate. The user terminals selectively transmit one or more packets to the access point in a time slot on the random access channel based on the allowed information rate and the packet transmission probability.

28 Claims, 5 Drawing Sheets

CONTENTION-BASED RANDOM ACCESS METHOD WITH AUTONOMOUS CARRIER SELECTION

BACKGROUND

The present invention relates to a contention-based multiple access protocol for an uplink channel and, more particularly, to a contention-based multiple access protocol that allows variable-rate and multi-packet transmission on the uplink channel by user terminals.

In a wireless packet data network, a plurality of user terminals transmit packet data to an access point over a shared uplink channel. A random access protocol is often used to share a portion of the uplink bandwidth among the user terminals. The random access protocol may be a reservation-based protocol or a contention-based protocol. In either case, the channel is typically divided in the time domain into a sequence of time slots. The user terminals share the channel by transmitting in different time slots. The channel may also use Orthogonal Frequency Division Multiplexing (OFDM) or Code Division Multiple Access (CDMA) to allow multiple user terminals to transmit in the same time slot. In such cases, multiple user terminals may transmit in the same time slot, but on different subcarrier frequencies or with different spreading codes.

A reservation-based random access protocol reserves resources for individual user terminals. The mobile stations request permission from the access point to transmit on the shared uplink channel. If the request is granted, the access point reserves resources for the user terminal and sends a grant message to the user terminal identifying the reserved resources. The reserved resources may, for example, comprise a time slot or portion of a time slot. After receiving permission, the user terminal transmits its data using the allocated resources. One shortcoming of reservation-based multiple access protocols is the delay incurred in the request/grant procedure.

In contention-based multiple access protocols, resources are not reserved and the user terminals compete with one another for access to the channel. One such protocol is called slotted ALOHA. In slotted ALOHA, the shared uplink channel is divided into a sequence of time slots. When a user terminal has data to transmit, it selects a time slot and begins its transmission at the start of the selected time slot. With single packet reception, the packet will be received by the access point if no other user terminal transmits in the same slot. However, if another user terminal transmits in the same time slot, a collision occurs and neither packet will be received. In the event of a collision, each user terminal backs off a random amount and retransmits in another time slot. It has been shown that the maximum throughput using slotted ALOHA is 0.36 packets per slot. This low throughput is the main disadvantage of the slotted ALOHA approach.

Multi-packet reception (MPR) can be used to significantly improve the throughput of the slotted ALOHA approach. With MPR, the access point can receive multiple packets in the same time slot and frequency without collision. A number of techniques can be used to enable MPR including use of multiple receive antennas at the access point, code multiple access (CDMA) techniques, and multi-user detection techniques. The recently proposed Dynamic Queue Protocol exploits MPR capability of the receiver to provide an efficient access scheme.

MPR protocols developed to date have concentrated on the symmetric case where all packets have the same probability of reception. To achieve symmetry, it is assumed that power control is employed so that all packets are received with the same power by the access point. This approach, however, results in a very low system throughput because the user terminals in advantageous channel conditions are penalized.

SUMMARY

The present invention provides a method and apparatus for controlling transmission from a plurality of user terminals to an access point on a random access channel in a wireless communication system. An access point may determine an allowed information rate for each user terminal and transmit a rate control parameter indicative of the allowed information rates to the user terminals. The rate control parameter may comprise, for example, an allowed number of fixed rate packets that the user terminal may transmit in a time slot of the random access channel, or a code rate for a variable rate packet. The access point also computes a packet transmission probability and transmits the packet transmission probability to the use terminals on a common control channel. The packet transmission probability controls the number of user terminals that will transmit in a given time slot to reduce collisions and increase the departure rate. The user terminals selectively transmit one or more packets to the access point in a time slot on the random access channel based on the allowed information rate and the packet transmission probability. In one exemplary embodiment, the user terminals may transmit up to an allowed number of packets in the same time slot based on the rate control parameter. In another embodiment, the user terminals transmit a variable rate packet determined based on the rate control parameter.

DETAILED DESCRIPTION

Figure 1:
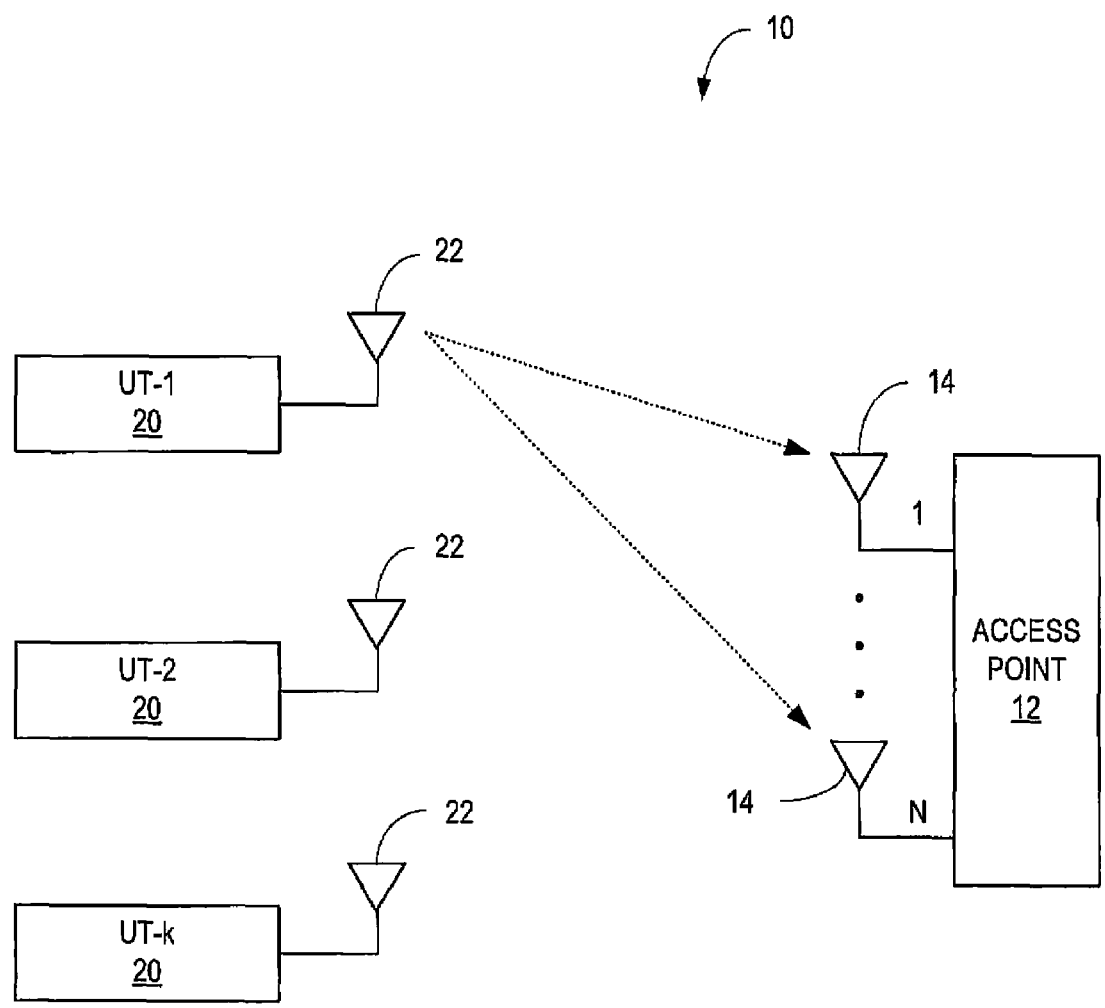
FIG. 1 illustrates an exemplary wireless communication system according to one embodiment.

Referring now to the drawings, FIG. 1 illustrates a communication network 10 comprising a plurality of user terminals 20 communicating with an access point 12 over a shared uplink channel. In the exemplary embodiment, access point 12 has multiple receive antennas 14. Each user terminal 20 has a single transmit antenna 22. However, the number of antennas 14, 22 is not a material aspect of the invention. The communication system may implement any know multiple access technology, including but not limited to code division multiple access (CDMA), time division multiple access (TDMA), and orthogonal frequency division multiplexing (OFDM).

The uplink channel is a contention-based random access channel. The multiple access protocol used is a variation of the slotted-ALOHA protocol. The uplink channel is subdivided into a plurality of time slots. To access the channel, the user terminal 20 selects a time slot and begins transmitting a data packet at the beginning of the time slot. The duration of the data packet equals one time slot. In the event of a collision, each user terminal 20 backs off a random amount and retransmits the data packet in another time slot.

In the exemplary embodiment, access point 12 employs multi-packet reception (MPR) to receive multiple data packets from one or more user terminals 20 in a single time slot. Because the access point 12 is equipped with multiple antennas 14, the access point 12 may exploit spatial and multi-user diversity of the user terminals 20 to jointly decode and demodulate multiple data packets that are simultaneously transmitted from one or more user terminals 20 in the same time slot. In general, the number of simultaneous packets that may be successfully received by the access point 12 in a single time slot equals the number of receive antennas 14. Those skilled in the art will appreciate that other MPR techniques may also be employed to increase the number of simultaneous packets. For example, CDMA and/or OFDM techniques may be used to enable MPR with only a single antenna 14.

In a conventional system using slotted-ALOHA, power control is used to ensure that packets transmitted from all user terminals 20 are received with the same power by the access point 12. Because the packet size and information rate is fixed for all packets, this approach results in a low system throughput because the user terminals 20 may not take advantage of favorable channel conditions to increase data rates. According to the present invention, two new techniques are employed in combination to achieve higher system throughput on the uplink channel. First, the present invention uses per antenna multiplexing so that each antenna 14 may receive up to K multiplexed packets in the same time slot. Secondly, the present invention employs rate control on the uplink channel to allow user terminals 20 with more advantageous channel conditions to transmit at higher overall information rates than user terminals 20 with less advantageous channel conditions. The rate control aspect allows the system to take advantage of multi-user diversity to improve system throughput.

Multiplexing packets received by each antenna 14 may be achieved by using direct-sequence (DS) or frequency-hopping (FH) spreading codes and/or by employing low-rate error control codes. With (pseudo-) random spreading and/or channel coding, up to KN multiplexed packets may be transmitted in the same time slot and received successfully by a receiver with N antennas employing multi-packet (or in other words, multi-user) detection.

Rate control is based on channel conditions reported to the access point 12 by the user terminals 20. In one embodiment, the user terminals 20 report channel conditions to the access point 12 and the access point 12 determines the information rate for each user terminal 20 based on the reported channel conditions from the user terminal 20. The access point 12 then transmits a rate control parameter indicative of the selected information rate to each user terminal 20. The rate control parameter may be transmitted over an associated control channel for the random access channel.

The information rate controlled is the number of information bits transmitted by the user terminal 20 in a single time slot of the random access channel. In one embodiment, referred to herein as the multi-packet approach, a user terminal 20 may transmit multiple packets in a single time slot. The size and coding for all packets is the same so that each packet has the same number of information bits. The rate control parameter from the access point 12 may comprise the allowed number of packets that may be transmitted. The information rate for a user terminal 20 in a given time slot is an integer multiple of the information rate for a single packet.

In another embodiment, referred to herein as the variable rate approach, each user terminal 20 may transmit a single variable rate packet in a given time slot. In this embodiment, the packet size is the same for all packets. However, user terminals 20 with advantageous conditions may transmit with higher code rates and thus higher information rates (e.g., more information bits). User terminals with less advantageous channel conditions transmit with lower code rates and hence lower information rates (e.g., fewer information bits). The rate control parameter may comprise the selected code rate for the packet. The information rate in this embodiment varies proportionally with the code rate.

In both embodiments described above, system throughput may be maximized by controlling the number of user terminals 20 that will attempt transmission in a single time slot to reduce the number of collisions. In a slotted ALOHA system, each user terminal 20 attempts transmission in a time slot independently. Assuming that the number of user terminals 20 is large and the probability q of transmission of a packet in a given time slot is small, the actual transmission attempts will be Poisson distributed. Assuming an attempt rate g, the distribution of attempts a is given by:

$$Pr(a\ attempts) = \frac{e^{-g}g^a}{a!} \qquad \text{Eq. (1)}$$

The normalized packet departure rate, defined as the expected number of successful packet transmissions per time slot divided by the multiplexing factor K, is given by:

$$E[D] = \frac{1}{K}\sum_{k=0}^{KN}\frac{ke^{-g}g^k}{k!}, \qquad \text{Eq. (2)}$$

where k represents the access demand and N represents the number of receive antennas 14. For a conventional slotted ALOHA (e.g., N=1, K=1), the maximum departure rate is 1/e=0.3679 achieved at an attempt rate g=1. It may be shown that the maximum normalized departure rate for K=2 and N=1 is 0.42 achieved at an attempt rate of 1.618. Thus, a slotted ALOHA system that implements some form of per-antenna multiplexing achieves a higher maximum normalized departure rate than a system in which only one packet is received per antenna 14 in each time slot. This gain is due to the fact that two or more packets have to be transmitted to cause a collision in a conventional system, while three or more packets have to be transmitted to cause a collision when per-antenna multiplexing is used. Thus, the probability of collision is smaller when per antenna multiplexing is used. This gain is referred to herein as the statistical multiplexing gain. It may be shown that as K approaches infinity, the maximum normalized packet departure rate E[D] approaches 1.

The maximum-possible throughput of a contention-based multiple access system is related to the maximum normalized departure rate by:

$$T_{max} = \eta E[D], \qquad \text{Eq. (3)}$$

where $\eta$ is the spectral efficiency of the multi-packet communication system in bits/s/Hz and r is the information rate per time slot. For a CDMA system with processing gain L and packet information rate r, the spectral efficiency $\eta$ is given by:

$$\eta = \frac{rK}{L}. \qquad \text{Eq. (4)}$$

The spectral efficiency depends not only on the transmission medium but also on the type of receiver. Multi-user receivers, such as the optimum Maximum Likelihood Sequence Estimation (MLSE) receiver and the linear Minimum Mean Squared Error (MMSE) receiver, have a much higher spectral efficiency than the conventional single-user receiver. For a CDMA system with random spreading codes in flat Rayleigh fading and $E_b/N_0=10$ dB, the spectral efficiency for a linear MMSE receiver is maximized for $K \approx L$. On the other hand, the spectral efficiency for an optimum MLSE receiver is maximized for $K \to \infty$. The maximum spectral efficiency for the MMSE receiver is less than a single-user system ($K=1$). On the other hand, the spectral efficiency for an optimum MLSE receiver for large K is greater than the single-user system. Note that the maximum-possible throughput of the contention-based multiple access system is directly proportional to the spectral efficiency as shown in Eq. (3).

To maximize system throughout, the access point 12 controls the attempt rate g so that the maximum departure rate is realized. More particularly, the access point 12 controls the attempt rate g by computing a packet transmission probability q and transmitting the packet transmission probability q to the user terminals 20 over a common control channel. The user terminals 20 transmit packets on the uplink channel based on the received packet transmission probability q. For example, if q=0.66, then two-thirds of the user terminals 20 with packets to send should transmit. An individual user terminal 20 may determine whether to transmit based on the outcome of a random event. For example, user terminal 20 may generate a random number between 0 and 1 and compare the random number to the packet transmission probability q. The decision to transmit is based on the outcome of the comparison.

The packet transmission probability q depends on the number user terminals 20 that have packets to send and the number of packets that each user terminal 20 is allowed to send. As the demand for access to the channel increases, the packet transmission probability q needed to maintain the desired attempt rate g decreases. The access demand, denoted as k, is the number of packets that may be transmitted in a time slot if all user terminals 20 with packets to send transmitted at the same time. The access point 12 may determine the access demand k based on status reports from the user terminals 20. User terminals 20 having packets to send may report their status to the access point 12 over an uplink control channel. The access point 12 may then determine the access demand k from the status reports from all user terminals 20 and the information rates for the user terminals 20. The packet transmission probability q may be updated periodically and transmitted to the user terminals 20 over a common control channel.

With the multi-packet approach, where user terminals 20 may send multiple packets per time slot, the transmission probability q may be computed according to:

$$q(k) = \max\left(\frac{Kg_0}{k}, 1\right), \qquad \text{Eq. (5)}$$

where K represents the multiplexing factor (e.g., the number of packets that may be received by each antenna) and $g_0$ represents the desired attempt rate that maximizes system throughput. As noted above, the access point 12 calculates the packet transmission probability q and transmits the calculated packet transmission probability q to the user terminals 20 over a common control channel. Each user terminal 20 attempts packet transmission in a time slot with a probability equal to the transmission probability q. If a user terminal 20 is allowed to transmit multiple packets in a time slot, it may decide each packet transmission independently or it may decide all packet transmissions jointly.

A power control algorithm may be used at the access point 12 to ensure that packets are received from all user terminals 20 with the same minimum power. User terminals 20 may employ different and preferably orthogonal spreading codes for packet transmission. Since the number of user terminals 20 in a contention-based multiple-access system may far exceed the processing gain, the spreading codes assigned to all of the user terminals 20 may not be mutually orthogonal. However, the spreading codes assigned to a user terminal 20 transmitting multiple packets in a time slot may be chosen to be orthogonal to limit self interference.

In the variable rate approach, where different user terminals 20 transmit at different code rates, the packet transmission probability q is computed as a function of the normalized access demand $\bar{k}$. If there are k packets of type j to be transmitted in the same time slot, the normalized access demand $\bar{k}$ is given by:

$$\bar{k} = \sum_{j=1}^{J} \frac{k_j}{K_j}, \qquad \text{Eq. (6)}$$

where $K_j$ is the multiplexing factor for type j packets. Given an access demand $\bar{k}$, which may be determined by the access point 12 based on status reports form the user terminals 20, the packet transmission probability may be computed according to:

$$q(\bar{k}) = \max\left(\frac{\bar{g}_0}{\bar{k}}, 1\right), \qquad \text{Eq. (7)}$$

where $\bar{g}_0$ is the value of the total normalized attempt rate that maximizes system throughput. The normalized attempt rate $\bar{g}_0$ is given by:

$$\bar{g} = \sum_{j=1}^{J} g_j / K_j \qquad \text{Eq. (8)}$$

For a system with J=2, $K_1=1$, $K_2=2$, the maximum normalized packet departure rate is roughly independent of the individual attempt rates ($g_1, g_2$). Thus, the same transmission probability q may be used for packets of all types. The transmission probability q may be communicated by the access point 12 to all user terminals 20. Each user terminal 20 attempts packet transmission in a time slot with a probability equal to the transmission probability q.

Packet rates may be controlled by varying the spreading factor in a CDMA system. User terminals 20 with high received power may be assigned codes with low spreading factor, while user terminals 20 with low received power may be assigned codes with high spreading factor. A power control algorithm may be optionally used to ensure that all packets are received with the same power and spreading factor product.

Figure 2:
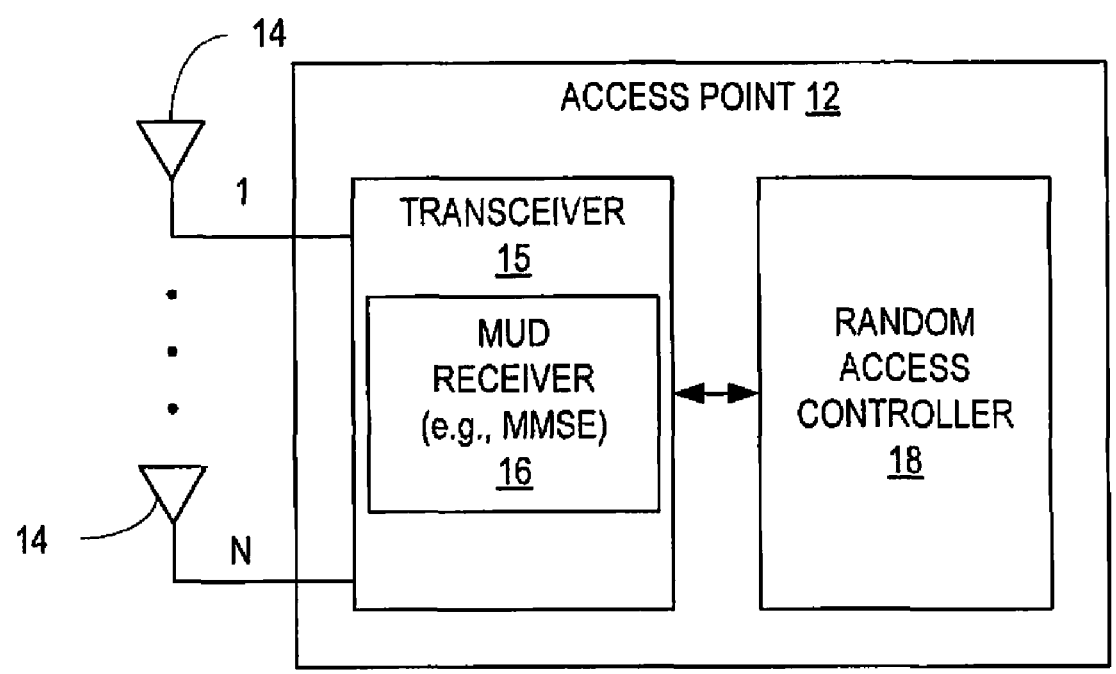
FIG. 2 illustrates an exemplary access point in a wireless communication system.

FIG. 2 illustrates an exemplary access point 12 for implementing the rate control techniques described herein. As previously noted, access point 12 has multiple receive antennas 14 to receive signals transmitted on the uplink channel from the user terminals 20. Receive antennas 14 are coupled to a transceiver 15 with a multi-user detection (MUD) receiver 16 that jointly detects the signals from the user terminals 20. The MUD receiver 16 may, for example, comprise a minimum means squared error (MMSE) receiver. The receiver 16 decodes and demodulates the received signals from the user terminals 20. A random access controller 18 determines the information rates for the individual user terminals 20 and the packet transmission probability. The random access controller 18 also implements any power control algorithms that are used. The user terminals 20 provide channel quality feedback (e.g., CQI reports) to the access point 12, which are used by the access point to determine information rates for the user terminals 20. The user terminals 20 also provide status reports indicating whether the user terminals 20 have packets to send on the uplink channel.

Figure 3:
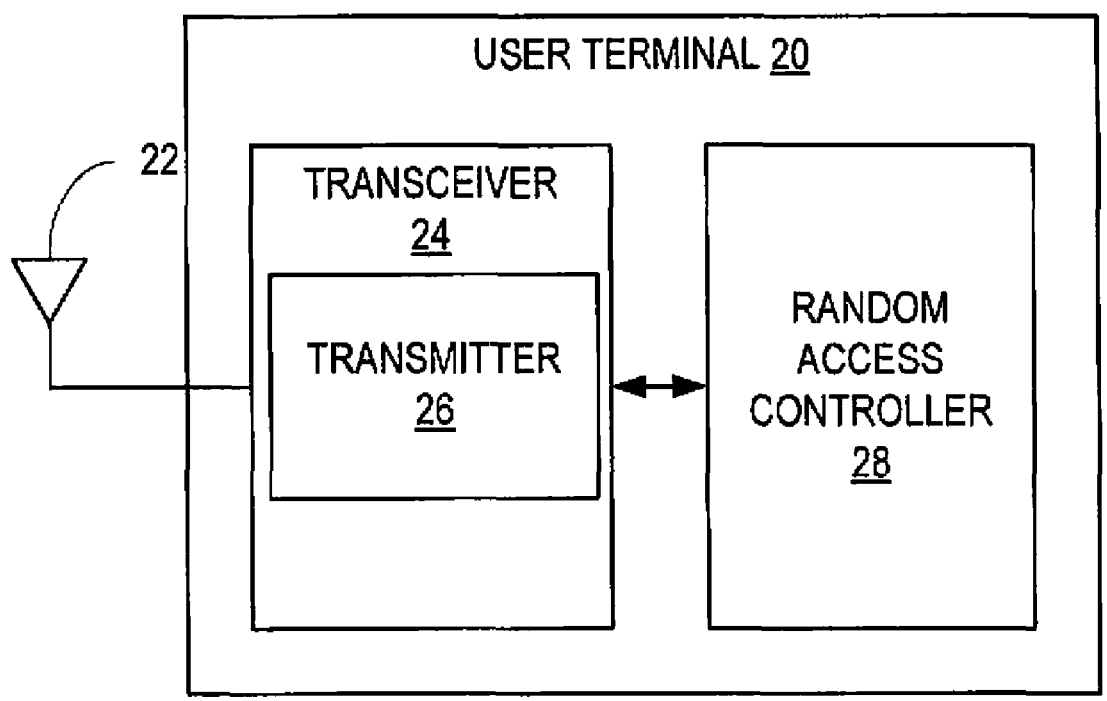
FIG. 3 illustrates an exemplary user terminal in a wireless communication system.

FIG. 3 illustrates an exemplary user terminal 20. User terminal 20 includes a single antenna 22 coupled to a transceiver 24. Transceiver 24 includes a transmitter 26 for transmitting signals on the random access channel. The transmitter 26 encodes and modulates signals for transmission on the random access channel. A random access controller 28 controls the information rate of the user terminals 20 based on a rate control parameter received from the access point 12. The random access controller 28 also implements the decision making for determining whether to transmit in a given time slot based on the packet transmission probability.

Figure 4:
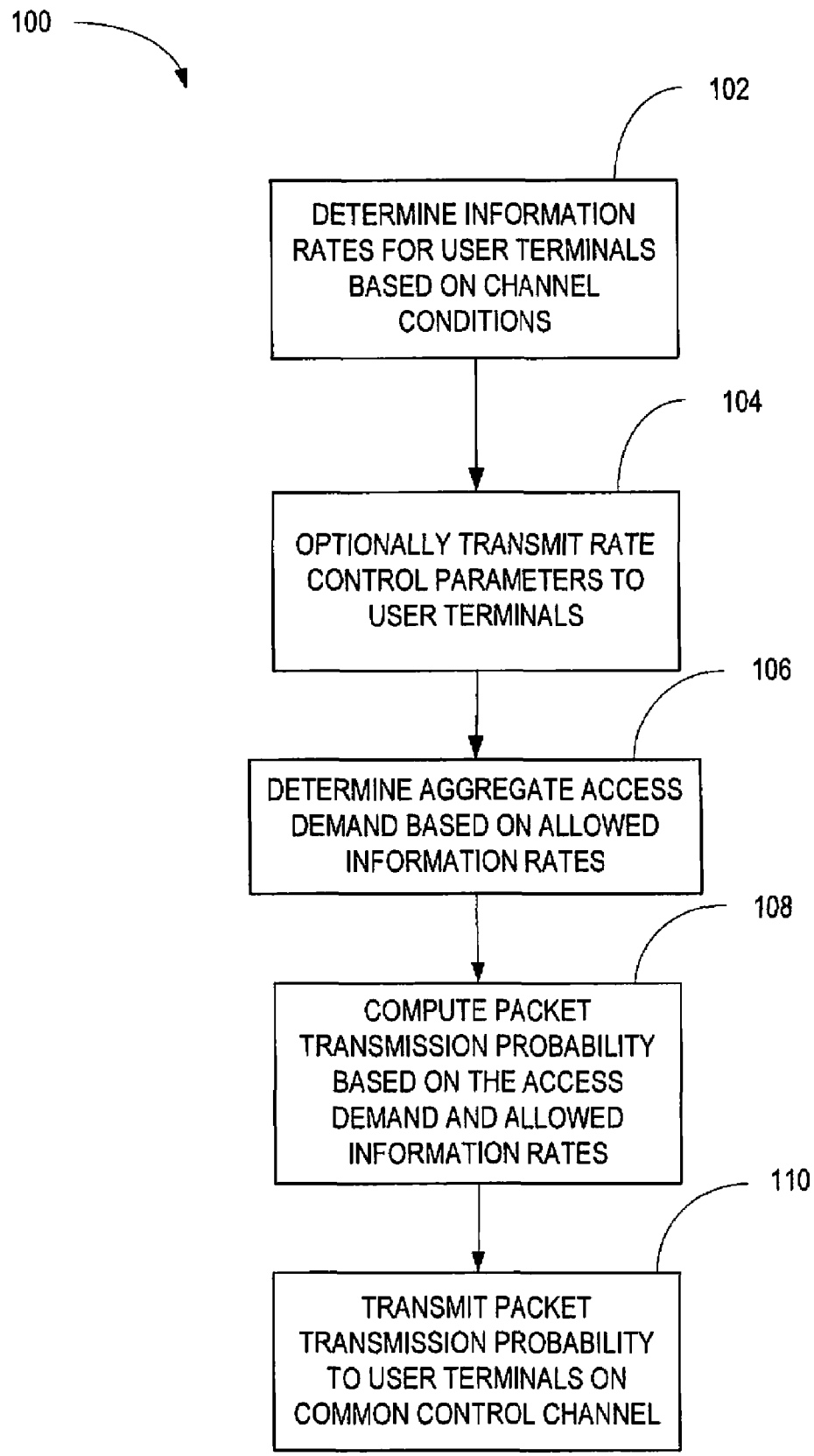
FIG. 4 illustrates and exemplary method implemented by an access point in a wireless communication system.

FIG. 4 illustrates an exemplary method 100 implemented by a wireless access point 12 for controlling packet transmission on a random access channel by one or more user terminals 20. As previously noted, access point 12 receives channel conditions and status reports from user terminals 20 over uplink control channels. Based on the channel condition reports, the access point 12 determines the allowed information rates for the user terminals 20 (block 102). User terminals 20 with favorable channel conditions are allowed a higher information rate than similar user terminals 20 with less favorable channel conditions. The random access controller 18 may optionally transmit a rate control parameter to each user terminal 20 indicating the allowed information rates for each respective user terminal 20 (block 104). The rate control parameter may comprise the number of allowed packets in the multi-rate approach, or the code rate in the variable rate approach. The rate control parameter may be transmitted on an associated control channel.

After determining the information rates for the user terminals 20, the access point 12 then determines the aggregate access demand for all user terminals 20 having packets to send to the access terminal 12 on the random access channel (block 106). The computation of the access demand only considers those user terminals 20 having packets to send. In the multi-packet embodiment, the aggregate demand is the total number of packets that the user terminals 20 are allowed to send in a time slot. In the variable rate approach, the aggregate demand is the total normalized number of packets that the user terminals 20 may send in a time slot, taking into account the varying information rates for different user terminals 20.

Once the aggregate demand is known, access point 12 computes a packet transmission probability (block 108). The packet transmission probability determines how many of the user terminals 20, on average, will transmit in a given time slot. For the multi-packet approach, the packet transmission probability is computed according to Eq. 5. For the variable rate approach, the packet transmission probability is computed according to Eq. 7. The access point 12 transmits the packet transmission probability to the user terminals 20 over a common control channel (block 110).

The access point 12 may compute the individual information rates for the user terminals 20 and the packet transmission probability on a periodic basis. For example, the information rates and packet transmission probability may be updated every n time slots. The number n of time slots between updates may be selected to achieve an acceptable trade-off between system throughput and system overhead. Also, those skilled in the art will appreciate that the number of time slots n between updates may be varied, depending on system load. For example, when the system is lightly loaded and system overhead is less of a concern, the number of time slots n may be reduced to make updates more frequent.

Figure 5:
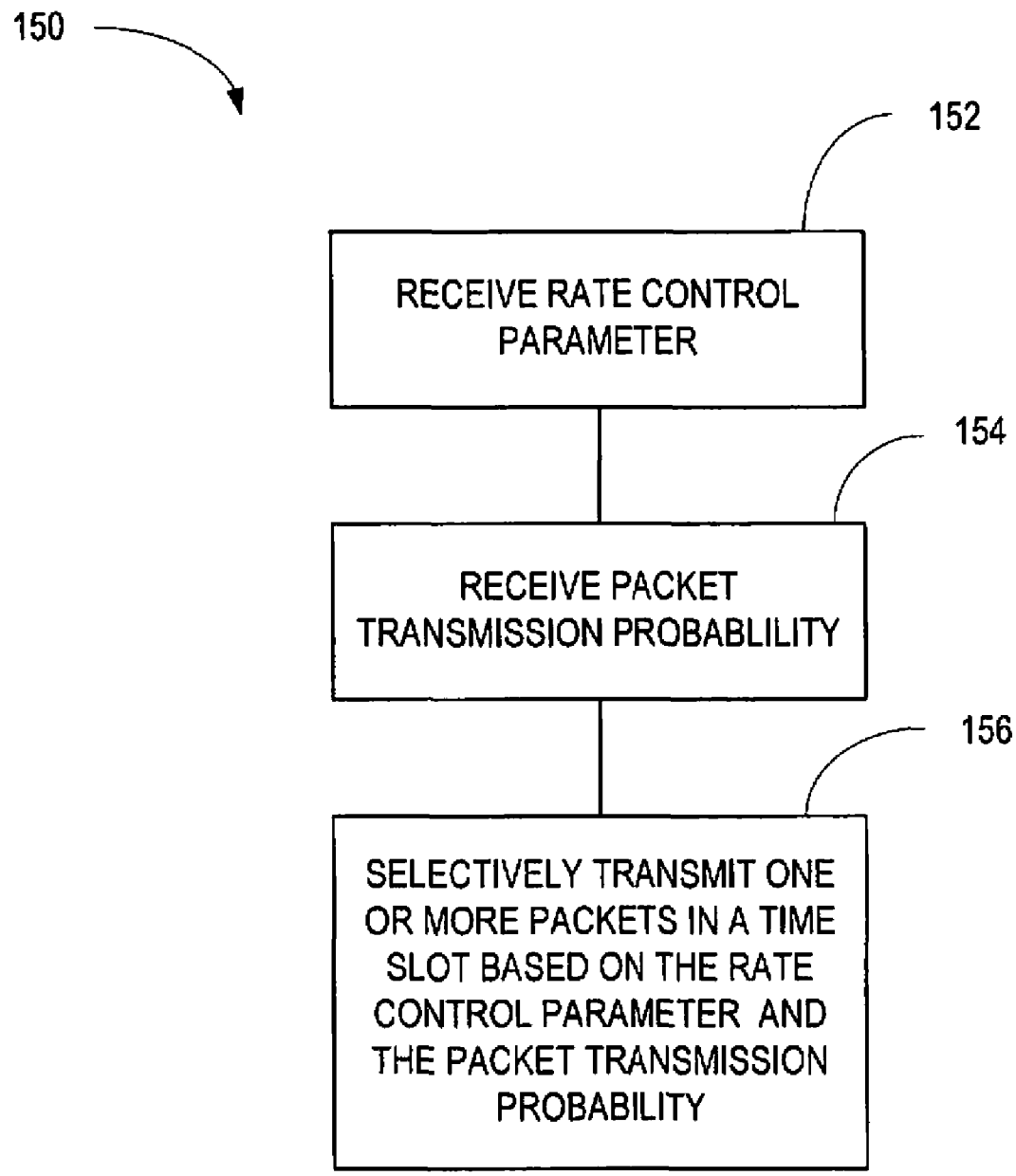
FIG. 5 illustrates and exemplary method implemented by a user terminal in a wireless communication system.

FIG. 5 illustrates an exemplary method 150 implemented by a user terminal 20 for transmitting packets on a random access channel. The user terminal 20 receives a rate control parameter from the access point 12 (block 152). For the multi-packet approach, the rate control parameter indicates an allowed number of packets that may be transmitted by the user terminal 20 in a time slot. The number of packets transmitted determines the information rate of the user terminal 20 and is computed based on channel quality reports provided by the user terminal 20. For the variable rate approach, different user terminals 20 may transmit at different information rates. The rate control parameter from the access point 12 indicates an allowed information rate for a variable rate packet to be transmitted in a time slot on the random access channel. The information rate is determined by the access point based on channel quality reports sent from the user terminal 20 to the access point 12.

The user terminal 20 also receives a packet transmission probability from the access point 12 over a common control channel (block 154). As noted above, the packet transmission probability is based on the maximum number of packets or normalized packets that may be sent in a time slot by user terminals 20 having packets to send. The user terminal 20 selectively transmits one or more packets in a time slot based on the rate control parameter and the packet transmission probability (block 156). In the multi-packet approach, the rate control parameter comprises an allowed number of packets that can be transmitted in a time slot. The user terminal 20 selectively transmits up to the allowed number of packets based on the packet transmission probability. The decision to transmit can be made separately for each packet when a user terminal 20 is allowed to send multiple packets, or a single decision may be made for all packets. In the variable rate approach, the rate control parameter is the code rate or information rate for a packet transmitted on the RACH. The user terminal selectively transmits a single packet with an information rate determined based on the rate control parameter. Again, the decision to transmit is made based on the packet transmission probability.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method implemented by a mobile access point for controlling packet transmission on a random access channel by one or more user terminals, said method comprising:

individually determining allowed information rates for one or more user terminals based on channel conditions of said user terminals;

determining an aggregate demand for said user terminals based on said allowed information rates, wherein the aggregate demand is defined as the number of packets transmitted in a time slot if all user terminals with packets to send transmit at the same time;

computing a packet transmission probability based on said aggregate demand; and transmitting said packet transmission probability to said user terminals.

2. The method of claim 1 wherein individually determining allowed information rates for a the one or more user terminals based on channel conditions of said user terminals comprises individually determining a number of fixed information rate packets allowed to be transmitted by said user terminals.

3. The method of claim 2 wherein determining the aggregate demand for said user terminals based on said allowed information rates comprises summing the allowed number of packets for said user terminals.

4. The method of claim 3 wherein computing the packet transmission probability based on said aggregate demand comprises determining an aggregate departure rate for said user terminals based on a multi-packet reception capability of said access point, and computing said packet transmission probability as a function of said aggregate departure rate and said aggregate demand.

5. The method of claim 1 wherein individually determining allowed information rates for a plurality of user terminals based on channel conditions of said user terminals comprises individually determining a packet information rate for packets to be transmitted by said user terminals.

6. The method of claim 5 wherein determining the aggregate demand for said user terminals based on said allowed information rates comprises determining an aggregate normalized demand for said user terminals.

7. The method of claim 6 wherein computing the packet transmission probability based on said aggregate demand comprises determining an aggregate normalized departure rate for said user terminals based on a multi-packet reception capability of said access point, and computing said packet transmission probability as a function of said normalized aggregate departure rate and said normalized aggregate demand.

8. An access point for controlling packet transmission on a random access channel by one or more user terminals, said access point comprising:

a transceiver; and a random access controller configured to:

individually determine allowed information rates for one or more user terminals based on channel conditions of said user terminals;

determine an aggregate demand for said user terminals based on said allowed information rates, wherein the aggregate demand is defined as the number of packets transmitted in a time slot if all user terminals with packets to send transmit at the same time;

compute a packet transmission probability based on said aggregate demand; and transmit said packet transmission probability to said user terminals.

9. The access point of claim 8 wherein the random access controller is configured to individually determine allowed information rates for the one or more user terminals by individually determining a number of fixed information rate packets allowed to be transmitted by said user terminals.

10. The access point of claim 9 wherein the random access controller is configured to determine the aggregate demand for said user terminals by summing the allowed number of packets for said user terminals.

11. The access point of claim 10 wherein the random access controller is configured to compute the packet transmission probability by determining an aggregate departure rate for said user terminals based on a multi-packet reception capability of said access point, and computing said packet transmission probability as a function of said aggregate departure rate and said aggregate demand.

12. The access point of claim 8 wherein the random access controller is configured to individually determine allowed information rates for a plurality of user terminals by individually determining a packet information rate for packets to be transmitted by said user terminals.

13. The access point of claim 12 wherein the random access controller is configured to determine the aggregate demand for said user terminals by determining an aggregate normalized demand for said user terminals.

14. The access point of claim 13 wherein the random access controller is configured to compute the packet transmission probability by determining an aggregate normalized departure rate for said user terminals based on a multi-packet reception capability of said access point, and computing said packet transmission probability as a function of said normalized aggregate departure rate and said normalized aggregate demand.

15. A method implemented by a user terminal in a group of one or more user terminals for transmitting packets to an access point on a contention-based random access channel, said method comprising:

receiving a rate control parameter from said access point indicating an allowed information rate for packets to be transmitted by said user terminal in a time slot on a random access channel;

receiving from said access point a packet transmission probability computed based on an aggregate demand, wherein said aggregate demand is defined as the number of packets transmitted in a time slot if all user terminals with packets to send transmit at the same time; and selectively transmitting one or more packets in said time slot based on said rate control parameter and said packet transmission probability.

16. The method of claim 15 wherein the rate control parameter comprises an allowed number of fixed rate packets that may be transmitted in said time slot.

17. The method of claim 16 wherein selectively transmitting one or more packets in said time slot comprises selectively transmitting up to the allowed number of packets in said time slot based on the packet transmission probability.

18. The method of claim 17 wherein selectively transmitting up to the allowed number of packets in said time slot based on the packet transmission probability comprises deciding transmission separately for two or more packets.

19. The method of claim 17 wherein selectively transmitting up to the allowed number of packets in said time slot based on the packet transmission probability comprises deciding transmission jointly for two or more packets.

20. The method of claim 15 wherein the rate control parameter comprises a code rate for a variable rate packet to be transmitted in said time slot.

21. The method of claim 20 wherein selectively transmitting one or more packets in said time slot comprises selectively transmitting said variable rate packet in said time slot based on the packet transmission probability.

22. A user terminal in a group of one or more user terminals for transmitting packets to an access point on a contention-based random access channel, said user terminal comprising:
a transmitter; and a random access controller configured to:
receive a rate control parameter from said access point indicating an allowed information rate for packets to be transmitted by said user terminal in a time slot on a random access channel;
receive from said access point a packet transmission probability computed based on an aggregate demand, wherein said aggregate demand is defined as the number of packets transmitted in a time slot if all user terminals with packets to send transmit at the same time; and
selectively transmit one or more packets in said time slot based on said rate control parameter and said packet transmission probability.

23. The user terminal of claim 22 wherein the rate control parameter comprises an allowed number of fixed rate packets that may be transmitted in said time slot.

24. The user terminal of claim 23 wherein the random access controller is further configured to selectively transmit up to the allowed number of packets based on the packet transmission probability.

25. The user terminal of claim 24 wherein the random access controller is further configured to decide transmission separately for two or more packets.

26. The user terminal of claim 24 wherein the random access controller is further configured to decide transmission jointly for two or more packets.

27. The user terminal of claim 22 wherein the rate control parameter comprises a code rate for a variable rate packet to be transmitted in said time slot.

28. The user terminal of claim 27 wherein the random access controller is further configured to selectively transmit said variable rate packet in said time slot based on the packet transmission probability.

* * * * *

UNITED STATES PATENT AND TRADEMARK OFFICE
CERTIFICATE OF CORRECTION

PATENT NO.        : 8,121,145 B2
APPLICATION NO.   : 12/255378
DATED             : February 21, 2012
INVENTOR(S)       : Hafeez et al.

It is certified that error appears in the above-identified patent and that said Letters Patent is hereby corrected as shown below:

On the Title Pg. Item (57), under "ABSTRACT", Line 9, delete "use terminals" and insert -- user terminals --, therefor.

In Fig. 5, Sheet 5 of 5, for Tag "154", in Line 2, delete "PROBABILILITY" and insert -- PROBABILITY --, therefor.

In Column 1, Lines 60-61, delete "code multiple access (CDMA)" and insert -- code division multiple access (CDMA) --, therefor.

In Column 2, Line 21, delete "use terminals" and insert -- user terminals --, therefor.

In Column 2, Line 42, delete "illustrates and exemplary" and insert -- illustrates an exemplary --, therefor.

In Column 2, Line 44, delete "illustrates and exemplary" and insert -- illustrates an exemplary --, therefor.

In Column 7, Line 53, delete "access terminal" and insert -- access point --, therefor.

In Column 9, Line 15, in Claim 2, delete "a the" and insert -- the --, therefor.

Signed and Sealed this
Nineteenth Day of June, 2012

David J. Kappos
*Director of the United States Patent and Trademark Office*